Oct. 21, 1952　　　A. J. DEWDNEY　　　2,614,886
LIQUID DISTRIBUTOR
Filed May 1, 1948

Inventor
Albert J. Dewdney
by Douglas S. Johnson
agent

Patented Oct. 21, 1952

2,614,886

UNITED STATES PATENT OFFICE 2,614,886

LIQUID DISTRIBUTOR

Albert J. Dewdney, Toronto, Ontario, Canada, assignor to Triumph Dishwashers Limited, Toronto, Ontario, Canada Application May 1, 1948, Serial No. 24,531

4 Claims. (Cl. 299—63)

This invention relates to a water or liquid distributor for spreading a stream of water, and more specifically to a distributor, particularly adapted for spreading water throughout an enclosing chamber.

The principal object of the invention is to provide a simple extremely efficient water distributing unit which will, with the minimum of loss, effect the spreading of a moving water stream in such a manner as to distribute the water as a heavy flow or wash of large size globules throughout a volume surrounding the distributor to give complete and thorough water coverage throughout the volume.

A further important object is to provide a practical and relatively inexpensive form of water distributor adapted to be arranged in an enclosing tub to give a thorough coverage throughout the tub, which flow may be uniform or can be arranged to provide desired concentrations of fast moving water globules at specific points within the tub.

The principal feature of the invention consists in providing a distributor unit having a spirally twisted deflecting surface generated by the revolution of a line with changing angle relative to the horizontal, and rotatably arranging the distributor centrally in the path of an axially moving stream to rotate in a plane perpendicular to the stream, whereby the water impinging on the deflecting surface of the distributor is deflected spirally in accordance with the changing angle of the deflecting surface to provide a water coverage throughout a volume swept out by the spirally deflected water stream upon revolution of the distributor.

A further and important feature consists in positively rotating the distributor about an axis arranged axially of the moving stream whereby the stream is deflected with the minimum of loss in momentum.

Referring to the accompanying drawings.

Referring to the accompanying drawings my distributor comprises a block 1 having a central depending hub 2 and formed with a dome-shaped or arched upper surface 3.

Figure 1:
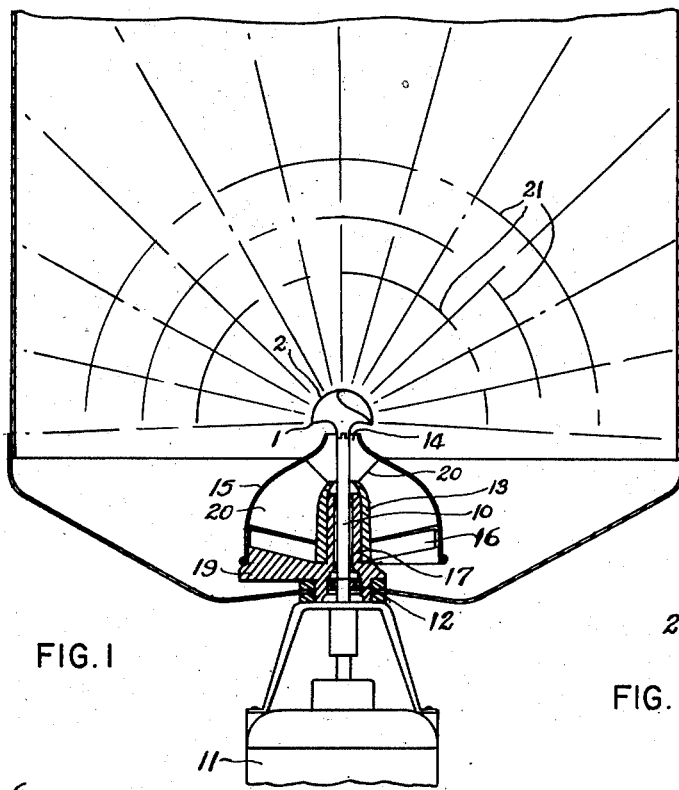
Figure 1 is a part vertical sectional and part elevational view illustrating my new distributor as used for distributing an axially flowing stream as thrown up by an impeller assembly throughout an enclosing tub.
Figure 2:
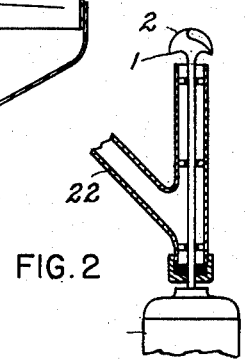
Figure 2 is a part elevational, part sectional view showing my distributor as used for distributing a liquid issuing from a supply pipe.
Figure 3:
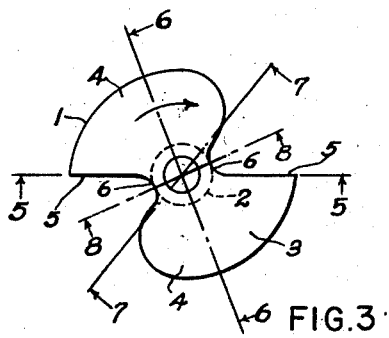
Figure 3 is a plan view of the preferred form of my distributor corresponding to the distributor as shown in Figures 1 and 2.

In Figures 1 to 8 the block is shown in the form of two oppositely disposed lobes 4 extending outwardly of the central hub and these lobes in plan have spiral shaped periphery as shown in Fig. 3 spiralling inwardly from the vertical diametrically opposite faces 5 towards the center. The lobes thus define two oppositely disposed peripheral "notches" 6 which extend inwardly to the central hub 2 to form a continuation of the vertical wall of the hub.

Figure 5:
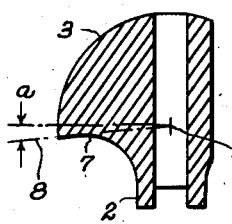
Figure 5 is a vertical sectional view taken on the line 5—5 of Figure 3.
Figure 6:
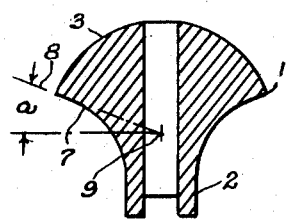
Figure 6 is a vertical sectional view taken on the line 6—6 of Figure 3.
Figure 4:
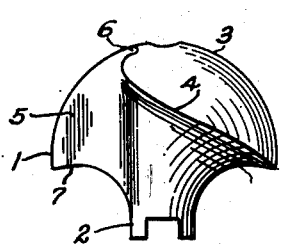
Figure 4 is an elevational view of the distributor shown in Figure 3.
Figure 7:
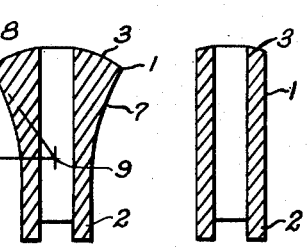
Figure 7 is a vertical sectional view taken on the line 7—7 of Figure 3.
Figure 8:
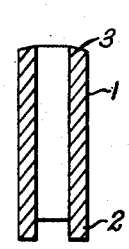
Figure 8 is a vertical sectional view taken on the line 8—8 of Figure 3.

The undersurfaces 7 of the lobes 4 form the deflecting surfaces and are spirally twisted as shown in the section of Figs. 5 to 8 with the angle $a$ of the surface of each lobe relative the horizontal continually changing around the lobe increasing from a negative angle as shown in Fig. 5 to an angle of 90° as shown in Fig. 8.

This spirally twisted deflecting surface 7 of each lobe can be considered as generated by the revolution of a line 8 revolving about the center 9 which forms the center of the arc of the domed upper surface 3 with the angle $a$ between the line 8 and the horizontal continually changing from a negative angle below the horizontal to the vertical. In actual practice or finished construction of course the deflecting surface is smoothly blended or curved into the hub 2 to provide the minimum of resistance in deflecting an axially moving stream of water flowing upwardly around the hub 2.

My distributor is particularly adapted for distributing a liquid throughout an enclosure such as a dishwashing compartment or the like as illustrated in Fig. 1.

In the illustration of Fig. 1 the hub 2 of the distributor is shown as secured to the end of a shaft extension 10 of a motor 11, the shaft extension projecting through the center of the bottom of a tub 12 in which it is desired to distribute a liquid.

An impeller assembly 13 which is shown as of the type described in copending U. S. Patent No. 2,572,983, dated October 30, 1951, is arranged to direct a quantity of liquid lying in the bottom of the tub upwardly around the shaft extension 10 through the opening 14 in the top of the impeller housing 15 and against the under spirally twisted deflecting surfaces 7 of the distributor lobes.

In the operation of the impeller the obliquely curved impeller blades 16 carried by the sleeve 17 secured to the shaft extension 10 and rotating about the stationary radial vanes 19 forces the liquid or water upwardly of the housing 15 where the straightening blades 20 force the water as an axially moving stream out the opening 14 and against the deflecting surface of the distributor. The distributor then deflects or turns this axially moving stream surrounding the shaft extension 10 outwardly at an angle corresponding to the angle a around the distributor.

The portion of the stream striking the distributor at section 5—5 is turned outwardly and downwardly at one side of the distributor and continues to flow vertically at the opposite side of the distributor.

The stream striking the distributor intermediate sections 5—5 and 8—8 is deflected at varying angles relative the horizontal corresponding to the varying angle a while at section 8—8 the stream continues vertically upwardly, i. e. upwardly through the notches 6.

Each lobe 4 thus effects a spiral distribution of the stream from a negative angle relative the horizontal to the vertical. The positive revolution of the distributor in a plane perpendicular to the stream flow through the rotation of the shaft 10 effects a distribution of the stream defined by the revolution of the spiral distribution providing in revolution a substantially hemispherical distribution with the equipotential liquid pressure surfaces diagrammatically illustrated by the lines 21, Figure 1, forming the surfaces of a sphere.

With this distribution obtained a complete coverage of all parts of the tub with a heavy flow of large size liquid globules is obtained and this has been found to be extremely effective in scouring the surfaces of articles such as dishes or the like placed in the tub.

My distributor may of course be used wherever an outward distribution of liquid of heavy flow in all directions around, above, and below the distributor is required.

In Fig. 2 the impeller assembly is dispensed with and the distributor is arranged centrally in the path of a stream of water issuing with high velocity from the mouth of the pipe 22. Again the distributor is positively rotated by the motor 23 in a plane perpendicular to the direction of flow of the stream and about an axis coincident with the axis of the stream.

Other arrangements may of course be provided for delivering an axially moving stream against the deflecting surfaces 7 of the distributor.

Figure 9:
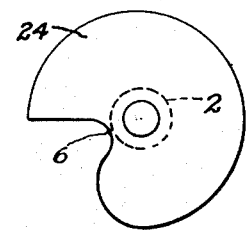
Figure 9 is a plan view of an alternative form of distributor employing only a single load.

With regard to the direction of rotation it has been found desirable to rotate the distributor in a direction illustrated in Fig. 3 to advance the highest portion of the deflecting surfaces 7 into the axially moving stream with the diametrically opposite faces 5 in a trailing position. However, opposite rotation of the distributor provides an almost equally effective distribution. While the preferred form of distributor incorporates the two lobes 4 it will be understood that any number of lobes may be provided if desired. Fig. 9 shows in plan a distributor in the form of a single lobe 24. As before the undersurface of this lobe will be spirally twisted and sections through the lobe will appear generally similar to the sections Figs. 5 to 8 with the angle of the deflecting surface changing from adjacent the horizontal to the vertical.

Similarly any number of lobes may be provided although where the number of lobes is even a more desirable dynamic balance is obtained.

If it is desirable to distribute the liquid only above the distributor, the angle a will always be positive. Where a considerable volume below the distributor is to be covered the angle a will of course have a relatively high negative value relative the horizontal at the faces 5.

Where equal distribution is to be obtained the deflecting surfaces are a smooth or even spiral with the angle a continually increasing in equal increments around the lobe while if unequal concentrations are required the increment change in angle a will be controlled as desired.

In making the distributor it can be formed in a simple die-casting operation and can be readily manufactured at a relatively low cost.

In use, it will be understood that an extremely desirable and thorough distribution of a liquid stream throughout a volume is obtained and by slightly modifying the deflecting surfaces the desired concentrations of liquid at various points throughout the volume can be obtained.

What I claim as my invention is:

1. A liquid distributing means comprising a block having a spiral under deflecting surface smoothly joining with a reduced central upright hub portion leading to said deflecting surface, said deflecting surface spiralling about a vertical axis extending through said hub and progressively inclining upwardly at an increasing angle relative the horizontal and receding inwardly around the hub towards the axis into vertical alignment with said hub portion presenting a continually changing deflecting angle around the hub, means to rotatably support said block axially in the path of an upwardly directed stream of liquid to deflect a portion of the liquid flowing as an annular column around said hub while permitting a portion of the stream to flow upwardly unimpeded, said block receiving a rotative thrust under liquid pressure when mounted in the path of said stream, and means to rotate said block against said rotative thrust.

2. A liquid distributing means of the type employing a distributor rotatively arranged in the path of a pressure liquid stream characterized in that the distributor comprises a block rotatable about a vertical axis and formed with a central upright cylindrical hub and having a spirally shaped deflecting surface surrounding the hub and progressively inclining upwardly and receding inwardly around the hub from a substantially horizontal surface portion extending at maximum distance radially outwardly of the axis of the hub to a substantially vertical surface portion in alignment with the hub thereby presenting a continually changing deflecting angle relative to the horizontal around the distributor to deflect a liquid stream impinging thereon outwardly in a substantially spiral distribution from directions adjacent the horizontal to the vertical.

3. A liquid distributor means comprising a block having an arched upper surface and a spiral-shaped under deflecting surface smoothly joining with a central cylindrical hub portion leading to said deflecting surface, said spiral deflecting surface progressively inclining upwardly and receding inwardly around the hub from a substantially horizontal surface portion extending at maximum distance radially outwardly of the axis of the hub to a vertical surface portion in alignment with said hub and presenting a continually changing deflecting angle around the hub, means to rotatably support said distributor axially in the path of a stream of liquid to deflect a portion of the liquid flowing as an annular column around said hub while permitting a portion of the stream to flow upwardly unimpeded, and means to rotate said distributor block in a plane perpendicular to the liquid stream flow to provide a substantially uniform hemispherical liquid distribution throughout a volume above and around said distributor.

4. A device as claimed in claim 3 in which said block rotating means rotates said block in a direction to advance the highest angle deflecting surface into said stream against liquid reaction acting to rotate said block in opposite direction to increase liquid dispersion.

ALBERT J. DEWDNEY.

REFERENCES CITED

The following references are of record in the file of this patent:

UNITED STATES PATENTS

| Number | Name | Date |
|---|---|---|
| 353,955 | McGaffey | Dec. 7, 1886 |
| 461,415 | Bonnette | Oct. 20, 1891 |
| 513,957 | Rundquist | Jan. 30, 1894 |
| 598,924 | Hale | Feb. 15, 1898 |
| 1,558,593 | Coffin | Oct. 27, 1925 |
| 1,813,807 | Kettering et al. | July 7, 1931 |
| 1,916,806 | Myrick | July 4, 1933 |
| 1,943,073 | Heverly et al. | Jan. 9, 1934 |
| 2,159,400 | Preston | May 23, 1939 |

FOREIGN PATENTS

| Number | Country | Date |
|---|---|---|
| 9,547 | Great Britain | May 2, 1908 |
| 194,300 | Great Britain | June 2, 1924 |
| 775,221 | France | Oct. 8, 1934 |